US012786314B2

(12) United States Patent
Thakare et al.

(10) Patent No.: US 12,786,314 B2
(45) Date of Patent: Nov. 3, 2026

(54) SYSTEM AND METHOD FOR ALTERING INTERACTION DISTRIBUTION SETTINGS

(71) Applicant: NICE LTD., Ra'anana (IL)

(72) Inventors: Swapnil Thakare, Pune (IN); Gaurav Suryawanshi, Pune (IN); Disha Agrawal, Pune (IN)

(73) Assignee: Nice LTD., Ra'anana (IL)

( * ) Notice: Subject to any disclaimer, the term of this patent is extended or adjusted under 35 U.S.C. 154(b) by 114 days.

(21) Appl. No.: 18/895,717

(22) Filed: Sep. 25, 2024

(65) Prior Publication Data

US 2026/0089262 A1 Mar. 26, 2026

(51) Int. Cl.

| | |
|---|---|
| ***H04M 3/00*** | (2024.01) |
| ***H04L 41/5061*** | (2022.01) |
| ***H04L 51/02*** | (2022.01) |
| ***H04M 3/51*** | (2006.01) |
| ***H04M 3/523*** | (2006.01) |

(52) U.S. Cl.

CPC ...... *H04M 3/5233* (2013.01); *H04L 41/5064* (2013.01); *H04L 51/02* (2013.01); *H04M 3/5191* (2013.01); *H04M 2203/402* (2013.01)

(58) Field of Classification Search

CPC ............. H04M 3/5233; H04M 3/5191; H04M 2203/402; H04L 41/5064; H04L 51/02

USPC ....... 379/265.01–265.14, 266.01–266.1, 309

See application file for complete search history.

(56) References Cited

U.S. PATENT DOCUMENTS

| | | | | |
|---|---|---|---|---|
| 6,389,132 | B1 * | 5/2002 | Price | H04M 7/0027 379/265.09 |
| 7,796,747 | B1 * | 9/2010 | McCormack | H04M 3/5233 709/204 |
| 10,728,392 | B1 * | 7/2020 | Chandrakant | H04L 67/54 |
| 11,909,918 | B2 * | 2/2024 | Li | H04M 3/5232 |
| 2012/0197678 | A1 * | 8/2012 | Ristock | G06Q 10/06 705/7.15 |
| 2024/0042264 | A1 * | 2/2024 | Moran | A63B 21/075 |
| 2024/0046171 | A1 * | 2/2024 | Kadu | H04M 3/5233 |
| 2024/0077170 | A1 * | 3/2024 | Zhou | F16M 11/18 |

* cited by examiner

*Primary Examiner* — William J Deane, Jr.

(57) ABSTRACT

A system and method for managing interaction distribution, for example in a contact center, may, for a digital skill relating to interaction handling and impacted by a lack of resources during an interval, determine an agent having the digital skill; raise the identified agent's concurrency setting for the digital skill for the interval; and distribute interactions according to the concurrency setting. The concurrency setting may determine how many interactions relating to the digital skill the agent can handle concurrently.

11 Claims, 10 Drawing Sheets

| Given | Interval | WEM Skills | Acd Skills | Required Agent |
|---|---|---|---|---|
| | 10:30 | C | E1 | 1 |
| | 11:30 | B | C1 | 1 |
| | | | D1 | 1 |
| | 12:30 | A | A1 | 2 |
| | | | B1 | 2 |

| WEM skills | channel |
|---|---|
| A | SMS |
| B | Email |
| C | Digital |

| Scheduled Agents | Agent WEM Skill | Agent Skill Proficiency |
|---|---|---|
| Agent 1 | A | 7 |
| | B | 8 |
| Agent 2 | B | 9 |
| Agent 3 | A | 10 |
| | B | 9 |
| | C | 10 |

| Agent | Omnichannel settings | | | | |
|---|---|---|---|---|---|
| | Voice | Chat | Email | SMS | Digital |
| Agent 1 | 1 | 2 | 2 | 2 | 2 |
| Agent 2 | 1 | 1 | 1 | 1 | 3 |
| Agent 3 | 1 | 2 | 2 | 3 | 2 |
| Agent 4 | 1 | 1 | 2 | 2 | 3 |

| Case | Agent3 applied for timeoff |
|---|---|

| Output | |
|---|---|
| | SLA for WEM skill C is impacted in interval 10:30, As it is Digital settings reduce the settings of other channel to zero for agent 1 |
| | No impact on SLA, increase EMAIL setting for agent 2 by 1 |
| | For interval 12:30, increase the SMS setting by 1 for agent 1 and 2 |

Fig. 5

SYSTEM AND METHOD FOR ALTERING INTERACTION DISTRIBUTION SETTINGS

TECHNICAL FIELD OF THE INVENTION

The present invention relates generally to the distribution of interaction data in a computerized data distribution system, specifically to the alteration of settings governing the distribution of interaction data.

BACKGROUND OF THE INVENTION

Contact centers use technology to distribute interactions (e.g. telephone calls, chat or text interactions, etc.) using networking technology so that agents can concurrently interact with several customers. Interactions may be in various modalities, such as text, e-mail, in-website chat sessions, or other communications channels. The ability to handle a certain modality may be termed a skill—for example, an agent skill may include handling chat interactions; and a different agent skill may include handling text interactions. Agent skills may include other skills, such as billing, technical support, etc. When one or more interaction requests are assigned to an agent who is already handling an interaction, the agent may interact with several customers at the same time.

It is desirable to govern or limit the number of interactions each agent handles at once, e.g. concurrently. As the number of interactions an agent handles at once increases, interaction durations as well as response times of the agent may increase, and quality may decrease. Different agents may be assigned different numbers of interactions at the same time, based on agent skill, experience, etc., and this may be reflected in a setting. For example, a setting may determine that agent X may handle up to X-limit chat interactions concurrently, and agent Y may handle up to Y-limit chat interactions concurrently.

The service level agreement (SLA) of a contact skill can be impacted, due to for example, higher interaction or contact volumes compared to the forecast; unplanned or planned staffing changes due to agents requesting for time-off, shift trading by agents, or agents not reporting to work. Current systems allow handling of this data manually, in a non-systematic manner. An SLA may be an "agreement" between a contact center and itself, governing service targets the contact center aims to provide. For example, a contact center operated by an internet provider may have an SLA specifying the level of service it aims to provide to users calling agents working on behalf of the internet provider.

Current technology may lead to deviation in the staffing plans, as in the event of unexpected time-off, the impact of SLA is not accurately known. As a result, supervisors manually track the out of SLA scenarios and in the case of digital contacts, using guesswork, manually manage contact settings for impacted channels for an agent.

SUMMARY OF THE INVENTION

One embodiment for managing interaction distribution, for example in a contact center, may, for a digital skill relating to interaction handling and impacted by a lack of resources during an interval, determine an agent having the digital skill; raise the identified agent's concurrency setting for the digital skill for the interval; and distribute interactions according to the concurrency setting. The concurrency setting may determine how many interactions relating to the digital skill the agent can handle concurrently.

Existing systems may handle staffing shortages manually, using managers' guesses and experience: supervisors may manage digital Omnichannel skills (e.g. skills indicating an agent can handle interactions on more than one channel at once) by increasing contact center settings controlling the number of digital contacts that agents can handle simultaneously. However, this requires supervisors to keep a close watch on a skill queue and perform manually intervention frequently. A skill queue may be a queue of end users waiting to be serviced by agents, where all users in the queue require a specific skill, such as technical support in Spanish. A skill queue may be a queue of tasks of a particular type.

An embodiment provides an automated solution which may predict the impact of an agent's time-off or absence on SLA. An embodiment may recommend corrective actions by suggesting adjustment to contact settings for agents. For example, if an embodiment detects a potential risk of missing out or not meeting SLA for a digital skill during a particular time interval, it may suggest increasing the simultaneous contact setting for select agents for the duration of impacted interval. These corrective actions may then be automated to change the settings at the beginning of such interval in future and revert to original value at the end of the interval in question. Such settings may be changed automatically, and/or recommendations may be shown to the manager to decide on approval for the time-off.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 depicts example data for a simulation of a process according to embodiments of the present invention.

Figure 1:
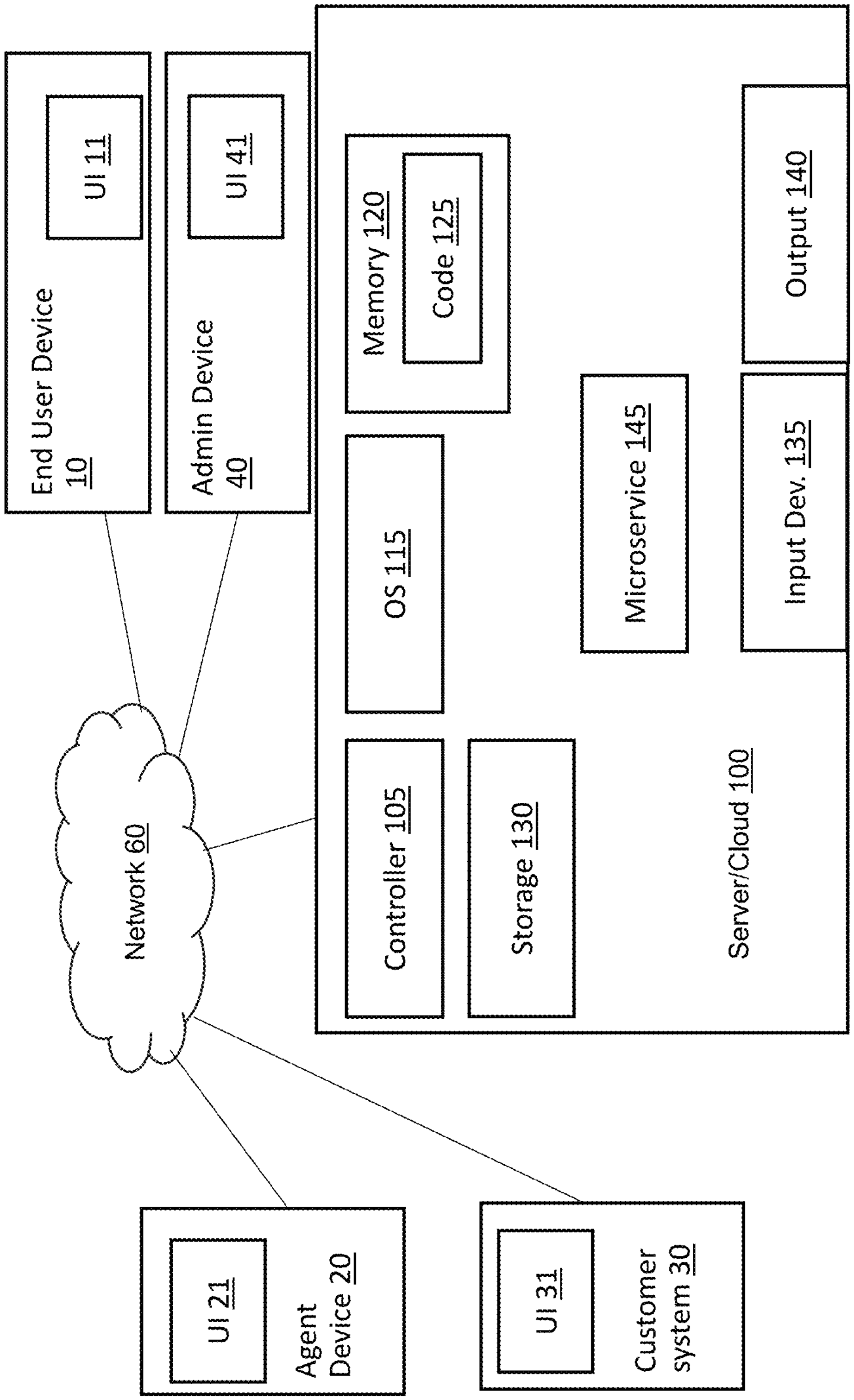
FIG. 1 shows a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments.

An embodiment of the invention includes a multi-step process to manage distribution of data including interactions to agent computers or devices, and to automate changes to contact handling settings for specific agents for a specific time, which may control automatic distribution of the interactions. Distribution of interactions may include routing data describing the interactions within a technology system, connecting the devices (e.g. user and agent) participating in the interaction, or other operations. When an event occurs altering available agent capacity, e.g. an agent requests for time off, a shift trade occurs (e.g. agents trading shifts, which may alter the skill level or call handling ability during a shift), when higher volumes of interactions (e.g. more than expected incoming calls to a contact center for a period of time) occur, or when an agent is unexpectedly absent, an embodiment may determine or identify if it will impact service level (e.g. SLA) for agent handling of certain channels, which may be described by digital skills, e.g. categories of interaction handling. An embodiment may identify the time interval(s) for which a service level or SLA may be impacted. These operations may be performed based on or considering the forecasted volume and staffing for the skill. A digital skill may include a category of interaction handling, or the ability of an agent to handle a certain modality, customer issue, etc. A digital skill may be for example handling an interaction via text messaging; handling an interaction via web-browser chat; and handling an interaction via e-mail; or other skills. An embodiment may identify the right or best specific agent for mitigation, for example by checking for the agents available in the affected shift or time interval that have or are associated with the same or appropriate digital skills or categories assigned. An embodiment may then identify the top or best agents who can handle contacts or interactions in addition to the contacts or interactions they are already handling based on, for example:

- Skill proficiency score, typically a unitless number, e.g. from 1 to 20 (e.g. 1 is the best and 20 is lowest in the CXone system); other proficiency ranges or methods of measurement may be used;
- Average handling time (AHT) for the impacted skill or modality, which may measure the average interaction length, in time, for an agent, for an agent handling a certain skill type of interaction, etc. A lower AHT may mean greater capability to handle parallel contacts: low AHT may be a proxy measure for agent competency, and selecting agents with low AHT may select agents most able to handle higher than normal concurrency; and
- Volumes for other voice skill s assigned to the specific agent (typically an agent handling one voice call is not permitted to handle any other interactions simultaneously, but other setting may be used).

An embodiment may automatically perform changes to settings such as "Contact Settings" in a unit such as an ACD, for example by raising the identified agent(s) concurrency setting for the affected digital skill. For example, if the contact settings for an agent is 2 for chats (e.g., indicating this specific agent can handle two chats at the same time), then it can be increased to 3 for the impacted interval and decreased or reverted to 2 later. A concurrency setting may determine how many interactions relating to the digital skill an agent can handle concurrently, in overlapping time periods, or at the same time: e.g. a concurrency setting of 3 for agent A for digital skill "e-mail regarding tech support" may mean that agent A can handle simultaneously three different e-mail interactions with three different end users regarding tech support. A concurrency setting or settings may indicate that an agent can handle more than one type of channel at the same time: for example for Agent A, a chat concurrency setting of 2 and e-mail concurrency setting of 3 may indicate that the ACD will distribute interactions to Agent A such that Agent A handles 2 chat interactions and 3 e-mail interactions at the same time. Agents may be assigned agent skills, e.g. based on their experience in handling customer interactions. Based on their skills, a number of parallel interactions for each channel may be set, e.g. concurrent assignment of one voice call, ten emails, or ten chats. A customer request for an interaction with an agent of a contact center may specify or may indicate a required skill, e.g. return of purchase items, of an agent for the agent customer interaction request. In case that an agent with a skill is found that matches the skill of a customer request for an interaction, the customer may be assigned to the agent, and the ACD will distribute the interaction data to that agent.

An interval may be a period of time, for example a block of time. An interval may be defined by a start time and duration (e.g. 1:00 PM and 15 minutes), a start time and end time, or in another manner.

In some embodiments an ACD and work force management (WFM) system are available in an integrated environment, and include a digital omnichannel (e.g. multiple modalities) use-case where agents can handle multiple contacts simultaneously. An embodiment may identify problems (e.g. understaffing) that may occur currently or in the future along with the exact interval when this problem can occur; identify agents that can handle additional contacts for the specific interval based on occupancy and metrics such as skill proficiency and AHT, etc.; and automate the process to change contact settings (e.g. in an ACD and revert to original settings at a later time, based on the need.

As used herein, "contact center" may refer to a centralized technology solution used for receiving or transmitting a large volume of enquiries, communications, or interactions. The enquiries, communications, or interactions may include telephone calls, emails, message chats, SMS (short message service) messages, etc. A contact center may, for example, be operated by a company to administer incoming product or service support or information enquiries from customers/consumers. The company may be a contact-center-as-a-service (CCaaS) company.

As used herein, "call center" may refer to a contact center that primarily handles telephone calls rather than other types of enquiries, communications, or interactions. Any reference to a contact center herein should be taken to be applicable to a call center, and vice versa.

An "interaction" may refer to data representing a communication between two or more people (e.g., in the context of a contact center, an agent and an end-user (sometimes termed customer)), typically via devices such as computers, end-user devices, customer devices, agent devices, etc., and may be via channels, for example, voice telephone calls, conference calls, video recordings, face-to-face interactions (e.g., as recorded by a microphone or video camera), emails, web chats, SMS messages, etc. An interaction may be distributed using technology (e.g. ACD) while it occurs, and may be recorded to generate an interaction recording. An interaction or interaction recording may also refer to the data which is distributed, transferred or stored in or by a computer system (for example the data stream distributed to an agent), and the data representing the interaction, including for example voice or video recordings, data items describing the interaction or the parties, a text-based transcript of the interaction, etc. Interactions may be computer-based interactions, e.g., voice telephone calls, conference calls, video recordings/streams of an interaction, face-to-face interactions (or recordings thereof), emails, web chats, SMS messages, etc. Interactions may be computer-based: for example, the interaction may have associated data or metadata items stored or processed on a computer, and the interaction may be tracked or facilitated by a server, the interaction may be recorded on a computer, data may be extracted from the interaction, etc. Some computer-based interactions may take place via the internet, such as some emails and web chats or telephone calls, or other networks, such as some telephone calls and SMS messages. An interaction may take place using text data, e.g., email, web chat, SMS, etc., or an interaction may not be text-based, e.g., voice telephone calls. Non-text-based interactions may be converted into text-based interaction recordings (e.g., using automatic speech recognition). An agent, e.g. an agent of a contact center may handle one or more interactions, e.g. with end users or customers, concurrently—at the same time—or one interaction at a time.

As used herein, an end user (sometimes termed customer) may refer to a person interacting with a contact center, e.g. with an agent of a contact center. An end user may initiate an interaction with an agent by sending an interaction request to a contact center, or calling the call center. Alternatively, an agent may initiate an interaction with an end user by sending an interaction request to a end user.

As used herein, "agent" may refer to a contact center employee that answers incoming interactions, and may, for example, handle end user or customer requests, e.g. end user interaction requests.

FIG. 1 depicts a system for moving and routing contact center interaction data, managing interaction data distribution, and automating changes to contact handling settings for users according to embodiments of the present invention. Referring to FIG. 1, agents using agent devices 20 may communicate with end users using end user devices 10 to provide customer service (only one such device of each type is shown for clarity, but many may exist in some embodiments). For example, agents may communicate using voice (e.g. a telephone call, or VoIP), text, chat, etc. with end users regarding technical support, billing, etc. A customer system 30 may execute applications and host systems to service end users (e.g. maintaining end user accounts, providing services such as computer related services, Internet or cable TV services, banking services, etc.), customer support services, and contact center services (e.g. determining which agents should communicate with which end users). A customer system 30 may be operated by an entity which provides customer service in cooperation with agents operating agent devices 20. For example, an internet provider may operate customer system 30 (e.g. as a service, using a cloud service, or in other manners) to track requests of users or customers of that internet provider, and coordinate agents using agent devices 20 providing support (e.g. technical support, account support, etc.) to those users or customers of the internet provider, where those users or customers themselves operate end user devices 10.

Server/cloud system 100 may operate an ACD, WFM system, concurrency engine, concurrency prediction engine, concurrency automation engine, and other systems to help customer system 30 to coordinate distribution of interactions to agents operating agent devices 20. In some embodiments, customer system 30 may execute some or all of such functionality, including ACD, WFM and concurrency functionality. Agent devices 20 may execute and display modules which are executed by server/cloud 100 (e.g. a CXOne module provided by NICE Ltd., a WFM module, a local ACD module, etc.), and also customer service modules which are executed by customer system 30.

An administrative or manager device 40 may allow an administrator or manager to interface with the various systems, such as view, input or configure skill, SLA, concurrency setting, or other data. Each of devices 10, 20, 30, and 40 may include user interfaces 11, 21, 31 and 41, respectively, which may allow users to view and/or input data. For example, UI 41 may be an ACD WebApp, allowing an administrator to view or configure skill, SLA and other data.

Various computer systems may be connected by one or more networks 60, such as the internet, or an intranet. A server or cloud system 100 (e.g. a remote cloud computing platform, a server, etc.) may carry out algorithms for distributing interactions (e.g., routing calls or chats), controlling a contact center, and changing contact center settings such as concurrency settings (while in one example such functionality is executed by system 100, contact center functionality may be in customer system 30, server/cloud 100, or both).

Devices and systems 10, 20, 30, 40 and 100 each may be or include, for example, a personal computer, a desktop computer, a laptop computer, a workstation, a server computer, a network device, a mobile computer, tablet or smartphone, or any other suitable computing device, or multiple or combinations of such devices. Devices 10 and 20 may also be telephones of various kinds, including traditional telephones (in which case agents may use an additional agent device 20 for computer related tasks), and telephone applications executed by computers. A set of example components such as a processor, memory, etc. are shown in device 100, and devices 10, 20, 30 and 40 may include similar components, but each of devices 10, 20, 30 and 40 may include other components.

Server or cloud system 100 includes example components which also may be used in other devices in some embodiments, and is shown in FIG. 1 as a high-level block diagram of an exemplary computing device according to some embodiments. Server or cloud system 100 may be one or more computer systems including a controller 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as modules, and microservice(s) (MS), units, etc. described herein, for example when executing code 125. More than one device 100 may be included in, and one or more computing devices 100 may be, or act as the components of, a system according to embodiments of the invention. One or more devices such as computing device 100 may carry out functions such as those described in FIGS. 2-4.

Operating system 115 may be or may include any code segment to coordinate, schedule, or otherwise managing operation of computing device 100, for example, scheduling execution of software programs or enabling software programs or other modules or units to communicate. Memory 120 may be or may include, for example, a Random Access Memory (RAM), a read only memory (ROM), a Dynamic RAM (DRAM), a Flash memory, a volatile or non-volatile memory, a cache memory, or other suitable memory or storage units. Memory 120 may be or may include a plurality of, possibly different, memory units. Memory 120 may be a computer or processor non-transitory readable medium, or a computer non-transitory storage medium, e.g., a RAM. Executable code 125 may be any executable code, e.g., an application, a program, a process, task or script. Executable code 125 may be executed by controller 105 possibly under control of operating system 115. One or more executable code 125 segments may configure controller 105 perform methods disclosed herein, and one or more executable code segments 125 may be loaded into memory 120 and cause controller 105, when executing code 125, to carry out methods described herein.

Storage system 130 may be or may include, for example, a hard disk drive, a CD-Recordable (CD-R) drive, a universal serial bus (USB) device or other suitable removable and/or fixed storage unit. Data used with methods described herein may be stored in storage system 130 and may be loaded from storage 130 into memory 120.

Input device(s) 135 may be or may include a mouse, a keyboard, a microphone, a touch screen or pad or any suitable input device. Output device(s) 140 may include one or more displays or monitors, speakers and/or any other suitable output devices. Any suitable number of input or output devices may be used. Various input/output (I/O) devices may be connected to computing device 100 as shown by blocks 135 and 140. For example, a wired or wireless network interface card (NIC), a printer, or a universal serial bus (USB) device may be included in input devices 135 and/or output devices 140.

Figure 2:
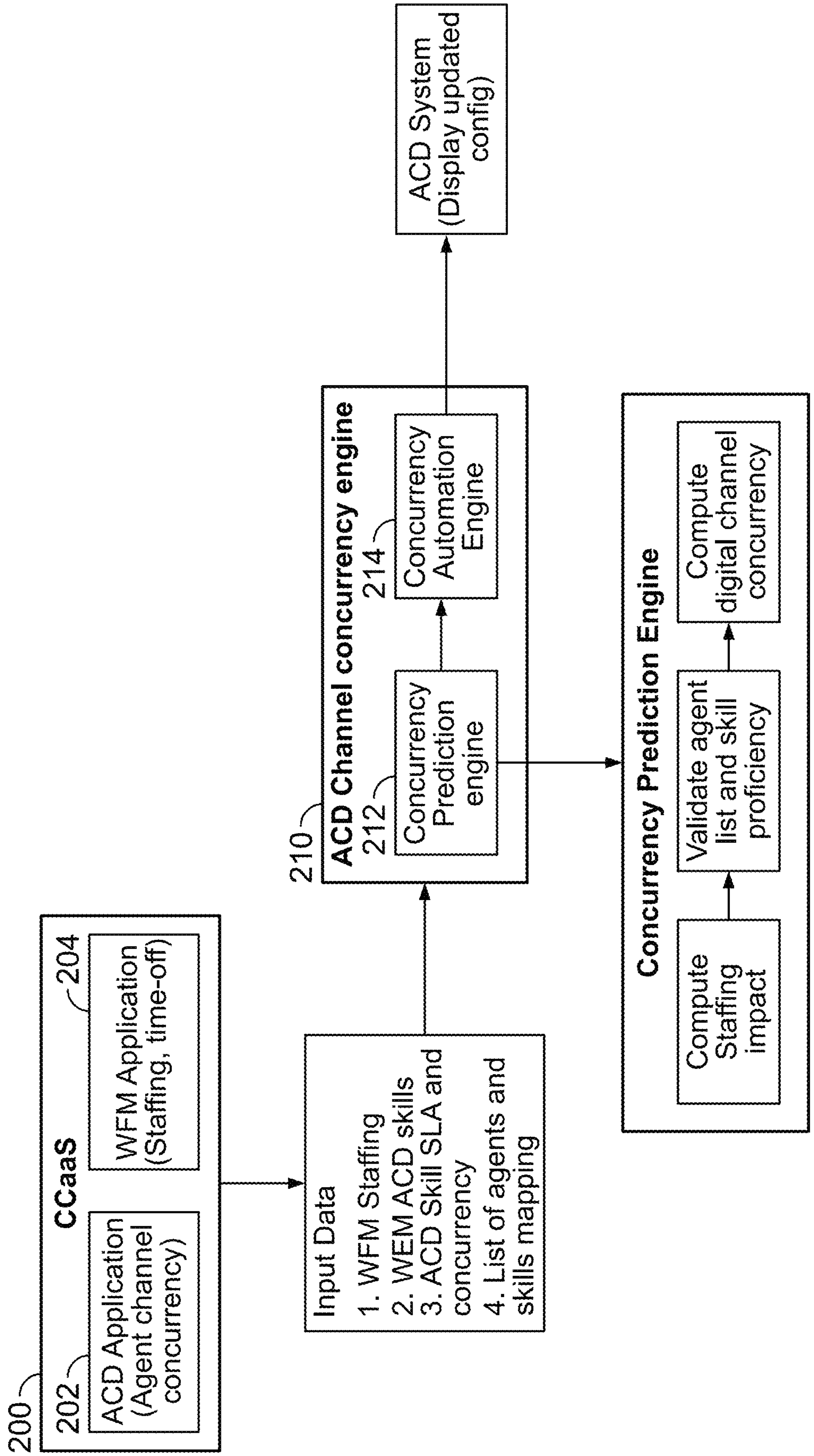
FIG. 2 is a schematic drawing of subcomponents of FIG. 1 according to some embodiments of the invention.

In one embodiment, components of FIG. 2, such as CCaaS (Contact Center as a Service) system 200, ACD (Automatic Call Distributor) 202 and WFM (Work force management) system 204, and their related components and database, are executed by controller 105 and server/cloud system 100, but some or all of such functionality may be performed by other components. Storage 130 may include a database including a data warehouse, a monolith application to store information about skills of agents, SLAs (Service Level Agreements), agent states, routing policies (relevant to routing data to the data warehouse host on a system such as an InContact cluster, provided by NICE Ltd.), a contacts handling section where for each user or contact center the number of concurrent contacts for each channel type are configured or stored, and other data. To integrate with other components, such as of a CXOne suite provided NICE Ltd., application programming interfaces (APIs) may be exposed by ACD 202 or other components. An embodiment may use such APIs to receive skills and SLA data from ACD 202 as input and perform scheduled actions of updates to for example the number of concurrent contacts handled for each digital channel for selected agent using these APIs.

Microservices 145 may exist in multiple physical locations, e.g. in the case that multiple cloud system 100*s* exist, e.g. geographically distributed. Microservices 145 may communicate for example using HTTP protocol-based REST APIs, using synchronous communication, but may communicate in other manners.

Microservices 145 may include a CXOne Platform admin microservice, provided by NICE Ltd., which may be a Java-based Spring Boot microservice operating within a cloud system such as the Amazon provided AWS cloud infrastructure, leveraging the Amazon provided ECS (Elastic Container Service) for containerized deployment. By distributing its containers across multiple availability zones, a CXOne Platform admin microservice or other microservices may ensure resilience against failures by maintaining redundant instances across distinct physical locations. A CXOne Platform admin microservice may include functionality such as managing users in a CXOne suite, using REST APIs exposed by service to allow managers/administrators to associate WFM skills with users (e.g. agents). Such APIs (e.g. REST APIs) may be used to determine agent and contact handling settings for each digital channel type and apply logic to provide insights to managers if a particular agent's schedule change request will impact the SLA of the skill associated with the agent.

Microservices 145 may include a WFM Schedule manager microservice, which may be a Java-based Spring Boot microservice operating within an AWS cloud infrastructure, leveraging ECS for containerized deployment, and may be distributed via its containers across availability zones. A WFM Schedule manager microservice may generate staffing summaries based on historical forecasted requirements, which may serve as the basis for scheduling agents' work shifts. This may include an asynchronous process driven by user inputs, where staffing data is computed in response to forecasted demands using for example an AWS Batch service. A WFM Schedule manager microservice may expose REST APIs, enabling managers to retrieve detailed information about net staffing summaries per specified intervals. Such APIs may support various filters such as WFM skills, agents, and scheduling units, allowing for precise querying and analysis. Such a microservice may interface with a schedule change impact analysis engine: for each interval, an engine may dynamically fetch staffing requirements from the microservice, applying the algorithm to find out the impact on skill SLA based on staffing requirements because of a schedule change.

Microservices 145 may include a WFM Schedule Request Manager MS, which may be a Java-based Spring Boot microservice operating within the AWS cloud infrastructure, leveraging ECS for containerized deployment across availability zones. A WFM Schedule Request Manager MS may save and fetch schedule change requests submitted by an agent, and may use REST APIs to receive schedule requests and apply logic to assess the impact on the SLA of skills.

While functionality described herein includes specific example Amazon and other technologies, other specific providers and systems may be used.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

While specific elements of FIG. 1 are hosted by specific computers, in other embodiments, such elements may be hosted by other computers, in cloud based systems, etc.

FIG. 2 is a schematic drawing of subcomponents of FIG. 1 according to some embodiments of the invention. The components of FIG. 2 may be contained in or executed by server or cloud system 100 of FIG. 1, but some or all may be in other systems, such as customer system 30. Referring to FIG. 2, a CCaaS (Contact Center as a Service) system 200, such as the NICE Ltd. CXOne system, may contain cross-suite applications such as an ACD (Automatic Call Distributor) 202 and a WFM (Work force management) system 204. ACD 202 may for example answer, receive, and distribute incoming or outgoing interactions or calls among agent devices 20, connecting the interactions between agent devices 20 and end user devices 10. WFM system 204 may store data regarding agents and help schedule when and how interactions may be distributed. Such interactions may be distributed or connected according to settings such as concurrency settings. For example, if system 100 receives a number of incoming requests from customers (via end user devices 10), for chats regarding billing, ACD 202 may distribute or connect those chat interactions to agents (via agent devices 20). ACD 202 may distribute three chat interactions to agent A if agent A has skill "chat; billing" with concurrency setting of 3, but may distribute only two to that agent if agent A's setting for this skill is 2, and in such case may instead distribute the third such chat to a different agent. ACD 202 and WFM system 204 may be hosted on a service (e.g. embodied by system 100) such as AWS (Amazon Web Service) and may serve as a data source. ACD 202 may be a Java-based service used to store ACD skill data and their SLA thresholds, and settings such as concurrency settings for each agent. ACD 202 may accept data 204 such as staffing, skill, SLA and agent data, and may execute an ACD channel concurrency engine 210. ACD channel concurrency engine 210 may include modules such as concurrency prediction engine 212 and concurrency automation engine 214.

ACD channel concurrency engine 210 may be a java-based service which analyzes the impact of agent time-off requests, inputting multiple parameters such as net staffing, list of agents with skill association, ACD skills with SLA values, contact handling settings, concurrency setting for each agent for each digital channel, etc. ACD channel concurrency engine 210 may execute an algorithm and produce output in the form of insights. Insights may include the impact of time-off on SLA and recommendations of changes to the number of concurrent contacts settings of other agents for the channel type. These insights may be finally integrated with time-off request for managers.

ACD 202, in some embodiments using ACD channel concurrency engine 210 may receive input data such WFM data, skills data, and a mapping of agents to skills, may perform functions such as determining agent(s) who can have concurrency settings increased in the event of lack of resources during an interval for a digital skill, and may output information to, for example, ACD 202, a display, or other modules. For example, concurrency prediction engine 212 may compute staffing impacts, validate agents list and skills proficiency (e.g., validate agents from a list of agents, to ensure they match selection criteria, and consider their skill proficiency, when changing the concurrency settings), and identify agents whose concurrency settings can be altered; and concurrency automation engine 214 may alter identified agents' settings. However, while the functionalities discussed herein are described as being embodied in certain modules and components, other modules or components may carry out some of all of the described functionality.

WFM 204 may be a workforce management system which executes multiple processes such as staffing, scheduling and time-off management. Staffing may include predicting the number of interactions for skills in durations of, for example 15 minutes. Based on the staffing requirements schedules may be generated by WFM 204. An agent may have the privilege to request a partial or full day off when they are scheduled on a particular day. Each agent may have a certain set of skills corresponding to which interactions they are supposed to or able to handle. In the case of skills involving omnichannel digital channels such as chat, email, SMS or text, etc., each agent may also have a contacts handling setting (e.g. within ACD 202) where an administrator may configure how many simultaneous contacts an agent can handle for a specific skill. A skill may be described by or mapped to digital channels, which in turn may be a type of interaction such as a chat channel, voice channel, e-mail channel, etc. A skill may be described by both a channel and a subject or ability such as Tech Support, Billing, etc. One or more skills may be mapped to a channel, for example skills "Billing" and "Password Recovery" may both be mapped or linked to a "Facebook Messenger" channel. For example, a first agent may handle three chats interactions in parallel, while another agent who is a beginner may be configured to handle two chats simultaneously. The administrators or supervisors may use a uniform setting for the entire team or may have separate settings for different agents based on their expertise. An increase in this setting would allow agents to handle more contacts simultaneously during peak volumes (and thus a component such as an ACD may distribute more interactions to such agents); but it could also cause burnout for agents. It is desirable to strike the right balance and ensure that the setting is not configured very high consistently. An embodiment may automatically perform, or supervisors may set, a moderate setting and may choose to increase it to handle peak volumes but change the setting back to the original setting to avoid agents being consistently overloaded. An embodiment may revert the setting to its original level after the time period or interval during which SLA is at risk, or after another time period. For example, before increasing the count of concurrency setting, an embodiment may check at what time interval the skill is at risk of failing SLA. If it is determined SLA is at risk during the interval of 09:00-11:30, then the relevant concurrency setting may be increased at 09:00 and reverted back to its original value at 11:30, at the end of this interval. In some embodiments, agents' concurrency settings may be below 100% capacity for the channel for the agent, and thus increasing capacity may not "overload" the agent.

In some embodiments, the setting for voice calls is always 1 and cannot change.

ACD 202 may be part of a platform such as the CXOne platform provided by NICE Ltd. ACD 202 may be any service capable of providing for example automatic contact distribution and storage of skill related data, and may store data describing ACD skills along with SLA KPIs (key performance indicators). ACD 202 may determine if a skill is impacted due to time off. Table 1 shows an example data structure including a skill as stored in an example ACD 202:

TABLE 1

```
{
"Skill name": Email,
"SLA": 90
}
```

Table 2 below shows example contact handling settings describing how many contacts of each channel can be handled by each agent:

TABLE 2

```
{
"Agent Name": John Doe
  {
"Channel Type": Email
"Concurrent Contacts": 2
}
{
"Channel Type": Chat
"Concurrent Contacts":3
}
  }
```

WFM system 204 may be an application with multiple integrated processes such as staffing and scheduling, and may act as a data store for staff data. Staffing data may be used to determine the number of agents required after the time-off is applied and analyze the impact on SLA. Table 3 below includes an example data structure showing example staffing data:

TABLE 3

```
{
"interval": "2024-01-01 05:00:00",
"skill": "Email",
"Required agent": 90
}
```

ACD channel concurrency engine 210 may accept input from multiple sources such as WFM and ACD systems. Input may include, for example, time-off requests, an ACD SLA and skill data, a number of concurrent contacts handled by each agent for each of the digital channels is processed, etc. ACD channel concurrency engine 210 may check for the agents available in the same interval where SLA is impacted and based on the existing contact or concurrency settings and skills or proficiency of the agents, may identify an agent whose concurrency setting can be increased for the impacted interval.

Concurrency automation engine 214 may, based on the recommendations of, for example ACD channel concurrency engine 210, automatically increase or alter the number of concurrent contacts handled by an agent at a future date and time; and revert or decrease this setting to previous configuration at the end of the impacted interval.

ACD channel concurrency engine 210 may be a Java-based Spring Boot microservice, may be one of microservices 145, and may operate within an AWS cloud infrastructure. ACD channel concurrency engine 210 may fetch details from other components such as other microservices described herein, apply algorithms to determine an insight of impact to SLA for digital skills because of a schedule change, and identify agents who can handle additional concurrent contacts on a digital channel to mitigate this impact. ACD channel concurrency engine 210 may then allow a manager or administrator to perform automated actions to temporarily increase the contact handling settings for impacted channels associated with an agent using ACD APIs. A manager may select automated actions for a future or upcoming interval, and an embodiment may automatically change the relevant concurrency settings for a future interval. For example, if an embodiment determines that SLA is at risk on a certain future date between 09:00 to 11:00 AM, a manager may approves the automated future changes to concurrency settings determined by an embodiment. Then, during the actual future period, the concurrency change will happen automatically without manual intervention.

An ACD channel concurrency engine 210 may accept input such as for example:

Time-off request of a user or agent to be analyzed;

Net staffing details with agent required per interval for a skill;

WFM skill and agent association; and

ACD skill and expected SLA threshold.

ACD channel concurrency engine 210 may then execute an algorithm such as shown in Table 4; other operations may be used:

TABLE 4

```
For every interval:
 Compute staffing impact for all ACD skill of agent who applied for leave
 If skills are impacted:
  Sort the impacted skills in the descending order of SLA
  For every impacted skill:
    Length of staffed list = 0
      Add agent to staffed list.
      If agent is not scheduled:
        Recommendation: Activate skill if deactivated
        Recommendation: Call the agent in
      If staffing == length of staffed list
        Recommendation: Skill is not impacted
        Break
      If agent is handling previous skills:
        Recommendation: Skill's SLA is likely to be impacted
      Move to next gent
    If staffing < length of staffed list:
      Recommendation: skill is impacted for the skill
Else :
 No impact on staffing. Leave can be granted
End
```

Figure 3:
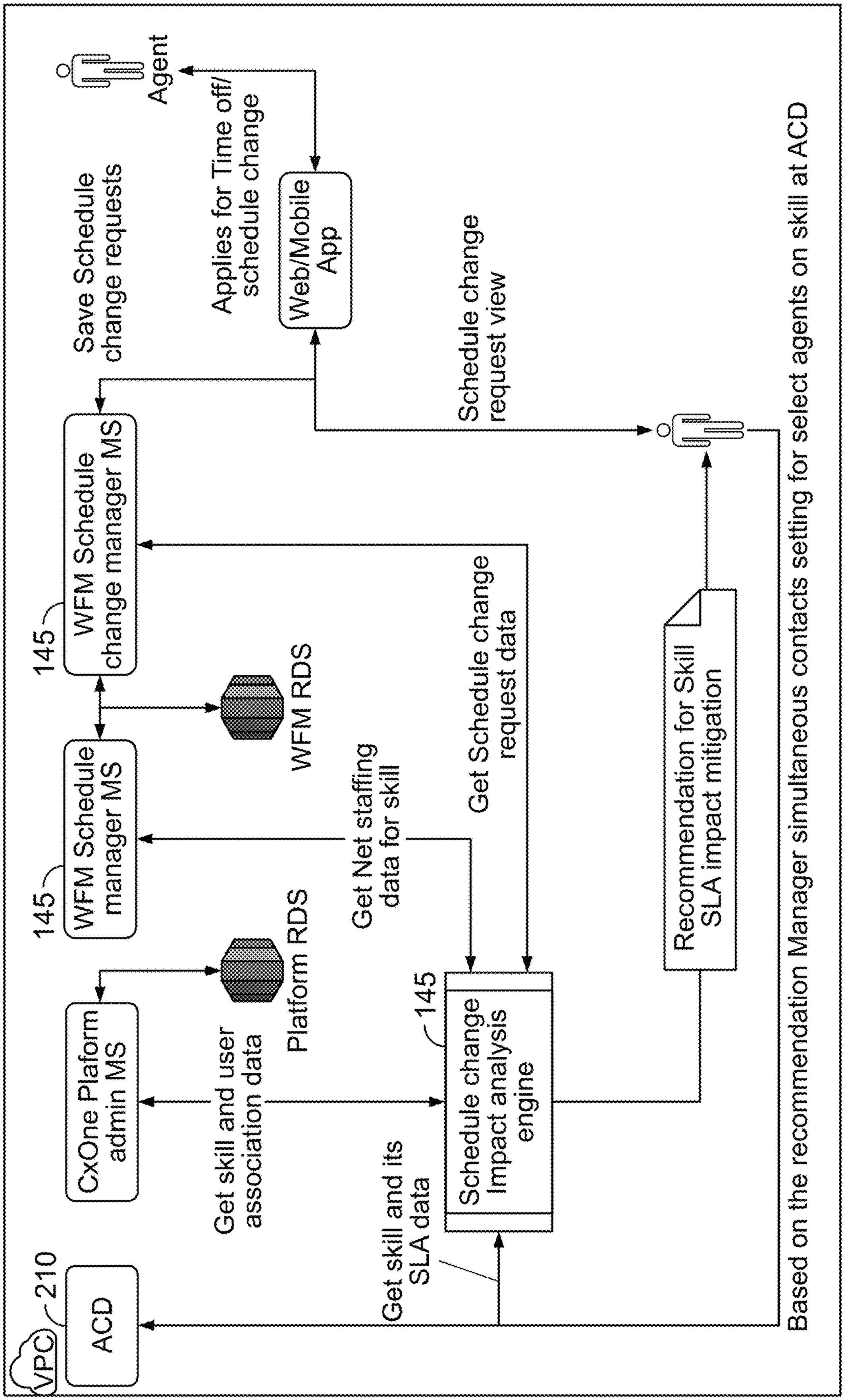
FIG. 3 is a schematic drawing of microservice related components according to some embodiments of the invention.

FIG. 3 is a schematic drawing of microservice related components according to some embodiments of the invention. The components and functionality of FIG. 3 may be contained in or executed by a system as shown in FIG. 1, or a different system. The example components of FIG. 3 may be deployed on, for example, an AWS private network with restricted access rules, or on another platform. An ACD Channel Concurrency Engine 210 may depend on input data received from different WFM, CXOne platform and ACD microservices (e.g. administration, schedule manager, schedule change manager, etc.) and components which are deployed as AWS ECS containers and using for example AWS RDS (Relational Database Service) as data storage. An agent may request time off via a web or mobile interface (e.g. UI 41) associated with a Workforce Management (WFM) application. Upon submission, a Schedule Request Manager (e.g. a microservice 145, possibly executed by controller 105) may store the request details in a relevant database. Managers may review submitted time-off requests and use published recommendations from an innovation engine (e.g. a microservice 145) to gain deeper insights into potential schedule adjustments. A Schedule Change Impact Analysis Engine (e.g. a microservice 145) may retrieve request details from the Schedule Change Manager Microservice using for example REST APIs, gathering information such as agent name and requested date/time changes. Leveraging an ACD system, the engine may retrieve agent skills and associated Service Level Agreements (SLAs).

To assess the impact, a Schedule Change Impact Analysis Engine may perform skill mapping, and may fetch the agent's associated skills from the Platform User Manager MS, and may retrieve staffing requirements based on the requested interval and specific skill(s). A Schedule Change Impact Analysis Engine may process the gathered data to discern the impact of the schedule change on skill SLAs. Insights or recommendations may be published or presented to the manager via an interface, e.g. admin device 40, accompanied by suggested actions to mitigate the impact of the schedule change. The suggested action could be changes to Contacts Handling concurrency settings for the channel type for selected agent(s). Such actions may be effected automatically, without manager intervention. Upon manager approval, the engine may execute appropriate actions, interfacing with IC ACD APIs to update the Contact Handling settings for the agents for certain channel type, ensuring minimal disruption to skill SLAs.

Figure 4:
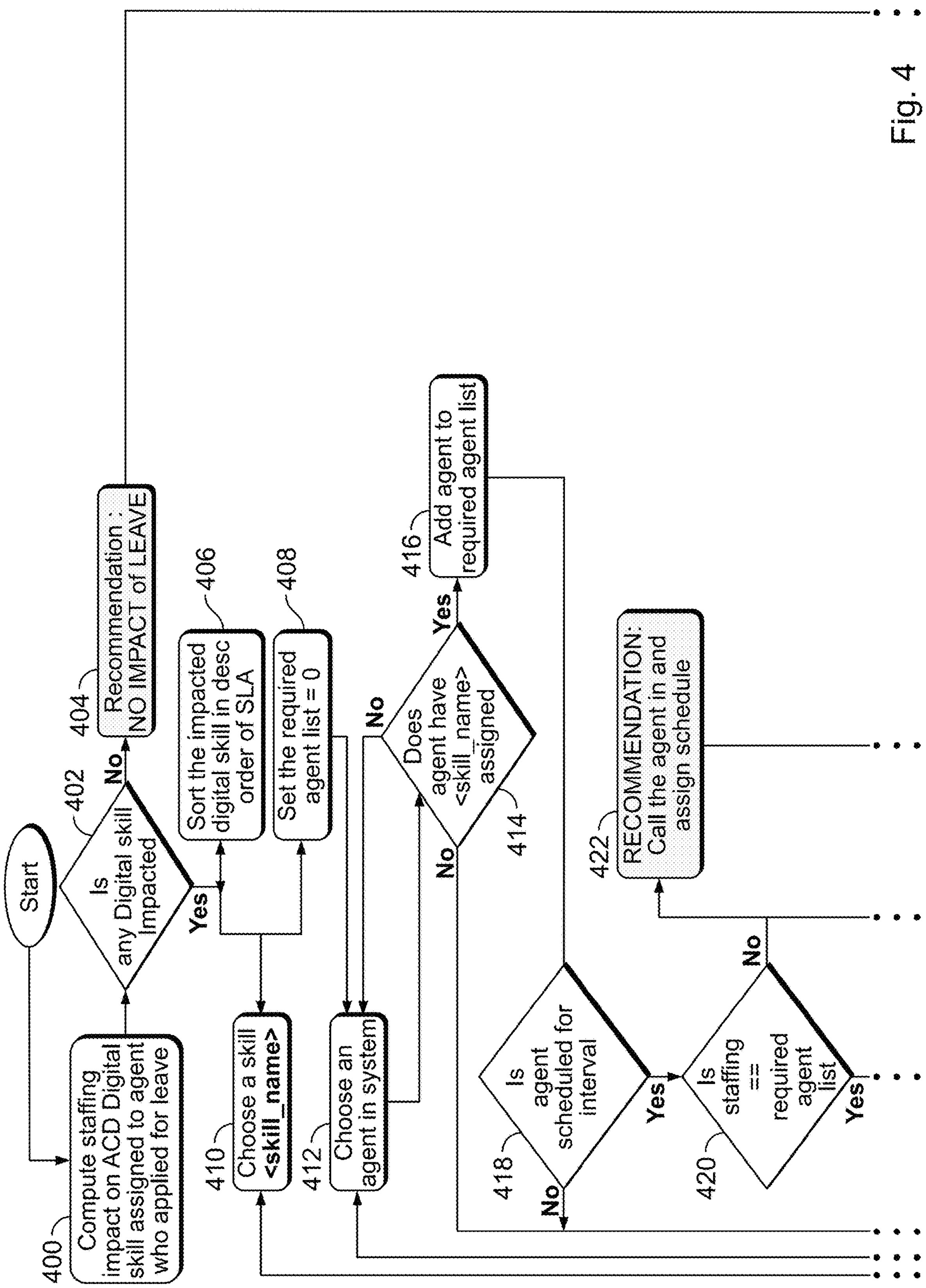
FIG. 4 depicts a flowchart of methods of distributing interaction data to agents, according to some embodiments of the present invention.
Figure 4:
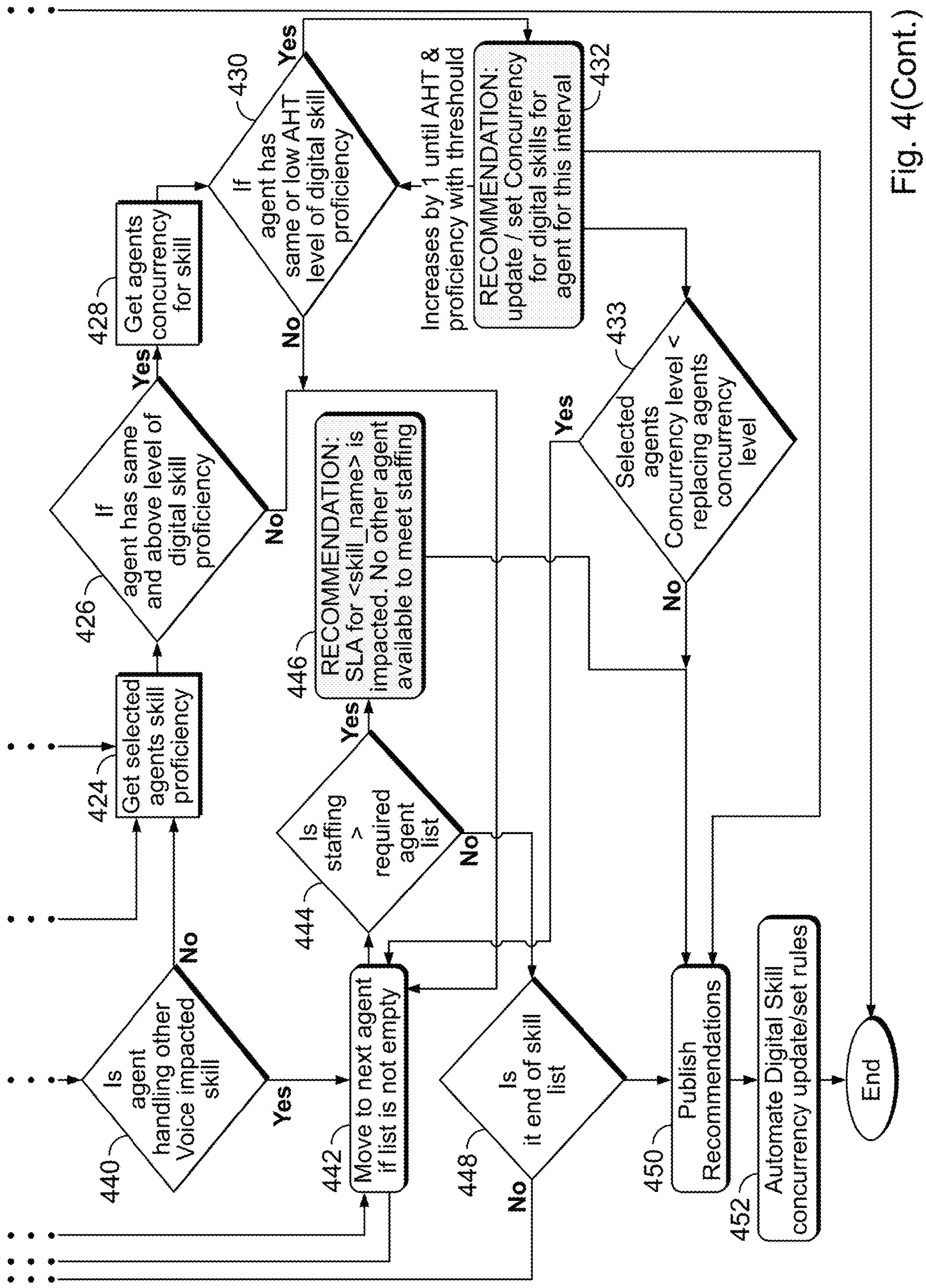

FIG. 4 is a flowchart for managing interactions according to embodiments of the invention. The process may begin when an agent applies for leave, asks for a shift trade, or otherwise provides input (e.g. via agent device 20); or when it is detected that there is a higher volume of interactions than expected, and the system assesses the impact on digital skills within the team. Referring to FIG. 4, in operation 400, staffing impact resulting from personnel absence, leave or unexpected load may be calculated, and impacted skills such as digital skills, if any, may be identified, along with the time intervals or time durations affected by the staffing impact. Staffing impact may be calculated the required staffing number against the current scheduled agents for this interval; if this number is negative or equal then three may be considered a staffing impact. In one embodiment, "impact" is defined by the number of agents being in deficit, regardless of skills, and the specific skills impacted is not specifically determined; rather the algorithm may increase concurrency until the required skill level for each impacted skill for an interval reaches the level defined by an SLA. For example, if agents' not showing up for work means that total concurrency across all agents for skill A for an interval is 18, and that an SLA requires total concurrency across all agents of 20 for skill A, a process may increase concurrency until total global concurrency for A is 20 for the interval. The remainder of operations depicted may each be done, separately, for each of the identified time intervals identified, such that an embodiment may search on a per interval level for solutions (e.g. change settings, and/or find suitable agent to fill the absence). Alternately, the entirety of the flowchart of FIG. 4 may be performed once for each separate time interval. WFM skill(s) associated with agents who applied for leave, staffing plans and schedules may be fetched from a Schedule Manager MS. This may be important to maintain SLA for digital skills. Staffing impact for WFM skill may be computed using the example formula New staffing=current staffing−1. The digital skills affected may relate to interaction handling and distribution—e.g. the digital skills and their settings may affect how an ACD distributes interaction data.

In operation 402, if it is determined that a digital skill is not impacted by the absence, leave or other event, in operation 404 no action needs to be taken; for example if no digital skill is impacted, the process may proceed to a recommendation that there is no impact of the leave and ends the process; a recommendation may be published or displayed that leave can be granted to the relevant agent.

For each of the impacted digital skills, a process may determine or identify if there are agents with similar skills available during the impacted interval. Operations 406, 408 and 410 may be executed if a digital skill is impacted. In operation 406, the impacted skill(s) may be sorted (using any suitable sorting algorithm) in the descending order of the skill with maximum out of SLA, such that the skills identified in operation 402 that have a maximum impact on service level are at the top of the list. This prioritization may ensure that skills with more critical SLAs are addressed first. For example, a process may prioritize the digital skills that are impacted based on the SLA. The skills with the most stringent SLAs may be handled first.

For each impacted digital skill, a process may initialize a list for staffed agents (e.g., Staffed agents=[ ]): a list may be created to keep track of agents who are currently staffed to handle the impacted skill using a list data structure. Thus the example process may first assemble a list of agents who have the skills to possibly help with the staffing issue; and then based on the agents' capacity (e.g., concurrency levels, ability to handle multiple calls) possibly change some agents' settings. In operation 408 a list of agents to be considered may be initialized: the eventual list (assembled later in the example flowchart) may include agents who have the identified skills, and are available or scheduled in the identified intervals. The list may omit agents currently on a voice call. The list may be filtered by agents who have a proficiency above a threshold, or the list may be sorted by agent proficiency, with the most proficient agents appearing at the top, to be chosen first. In one embodiment, the number of agents in the list is relevant because a staffing requirement may include a number of agents working, as well as skills requirements (e.g., three agents speaking a certain language must appear in interval X). Proficiency may be defined by, for example, average voice call handling time below a threshold (indicating short and thus effective calls), skill proficiency score (e.g. being higher than a threshold), or other metrics indicating the agent is good or effective at handling interactions, above a certain threshold of proficiency. In operation 410, the top skill from the list (e.g. the skill most affected) may be chosen for processing.

A process may iterate through each agent using the standard for or while loop: If the agent is assigned the impacted skill, add them to the staffed list. An example algorithm may check if the agent is assigned the skill that is impacted by the leave request. If so, the agent is added to the list of staffed agents for that skill. Such an operation may use the following example code snippet:

```
if agent.skills.contains(impacted_skill) {
Staffed_agents.add(agent);
}]]
```

Thus, in operation 412, an agent from among the known pool of agents may be chosen or considered; the process may start evaluating agents to find a replacement or adjust staffing. In operation 414, it is considered if the agent has the identified skill assigned to them. If the agent does not have the required skill, the process should skip the current agent and move to evaluate the next agent in the list; this may ensure that only agents with the required skill are considered for further actions. If the agent does have the skill (yes) in operation 414, in operation 416 the agent is added to the required agent list initialized in operation 408, and if no, the process moves to operation 412 (choose next agent), e.g. the process moves to the next agent.

In operation 418, it is determined if the agent is working or scheduled during the required interval; if yes, the process moves to operation 420 and if no, the process moves to operation 442. If the agent is not scheduled for the interval, the process may move to evaluate the next agent in the list, to ensure that only agents who are available during the required interval are considered for further actions. If the agent is scheduled during the shift, in operation 420 the agent's staffing impact is determined. Separate from skills capacity and requirements, a certain number of agents having any capacity of a certain skill may be required during each time interval, e.g. four agents having chat in Spanish skill (of any concurrency or capacity) may be required for interval 1:00-1:15 PM. Each human agent may be evaluated in this manner multiple times, each for a different skill. In operation 420 it may be determined if the agent list assembled so far is the required agent list, regardless of agent skill abilities, which is determined elsewhere in the process (e.g. if the names of agents on the list assembles includes all agents specified as being staffed during this time period or interval). If staffing does not include the required agent list (e.g. the specified agents required at this interval, regardless of skill, are not in the list), the process may recommend scheduling an additional agent, and after that, the process may evaluate if further adjustments to agent concurrency settings are needed. The process should not end after finding one agent but should continue until the staffing meets the required level and the concurrency settings are optimized. The process can loop through agents until these conditions are satisfied. The Required Agent List compared to staffing in operation 420 is a list of agents needed to adequately cover the digital skills during the interval while maintaining the desired SLA. Such a list may be based on agents who possess the necessary skills at the required proficiency level. The goal may be to have enough agents with the right skills scheduled to meet service demands.

If the determination in operation 420 is yes (e.g., there are enough agents with this skill in the list), the process may proceed to operation 440; if no, the process may move through a series of steps designed to add an agent to the list if possible. If the result of operation 420 is no, in operation 422 the recommendation (published in operation 450) is to communicate with another agent and try to schedule an additional agent (e.g. an embodiment may try to find an additional agent who has matching skills but not scheduled to work for given interval), and in operation 424, a process may retrieve the proficiency level of the agent in the required digital skill. A process may then check if the agent has a high skill proficiency and low AHT (which may indicate that the agent could potentially handle more concurrent contacts). If agents are identified that can handle a greater number of concurrent digital contacts, an example process may recommend that the concurrency setting for the digital channel corresponding to impacted skill be increased for the agent at the beginning of the interval and later reverted to initial setting at the end of the interval. In operation 426 a process may compare the agent's proficiency level with the required level which may be the proficiency level of the agent that is absent (the agent who caused the absence, leave or other event); and if the agent has the equal or greater proficiency, in operation 428, the process may obtain the agent's concurrency for the skill chosen in operation 410. In some embodiments, an agent may be assigned a proficiency level, score to determine agents' proficiency in a skill, e.g. between 1 (best proficiency) to 20 (lowest); a proficiency level need not be used. If the agent's proficiency is lower (e.g. "no"), the process may move to operation 442. In operation 430, if the agent has a high proficiency in the skill (e.g., AHT below a threshold for the skill, or same or low AHT), the process in operation 432 may output a recommendation in to alter, raise or increase, or may automatically raise or increase, the concurrency setting for this particular skill (identified in operation 410) for this particular agent, to be published in operation 450; a recommendation to alter concurrency settings may be acted on automatically or by a manager in operation 452. In one embodiment, operation 432 may, if AHT and/or proficiency are above a threshold and the raising of the concurrency setting has not solved the staffing deficit for the interval, move back to operation 430 to incrementally raise the concurrency level for the agent for the interval. In one embodiment concurrency settings are raised in the smallest unit, e.g. 1 (e.g. concurrency from 3 to 4), and the process may iterate to see if this incremental raising solves the deficit or service impact created by the lack of staffing (e.g. the absence, leave or other event); in other embodiments concurrency settings may be raised by different amounts. After operation 432, the process may move to operation 433, where it is determined if the selected agent's concurrency level is less than the replacing agent's concurrency level. If yes, the process may move to operation 442; if not the process may move to operation 450. A selected agent may be the agent being evaluated as a possible substitute during a certain iteration of FIG. 4, and more than one agent may have concurrency changed to make up for or substitute for the agent whose absence caused the low-staffing event. For example, if agent A calls in sick a process may iterate over an available agent list which may include for example agents B and D. Each of agent B and D will be processed or evaluated one after another, during different iterations. If B is selected in a first iteration of FIG. 4, B may be the "replacing" agent for and "absent" agent A, and in the next iteration D is selected for evaluation.

Raising an agent's skill may include an embodiment outputting a recommendation to raise a skill, and then receiving a manager's manager's input to raise the skill, and then raising the skill based on the input. An example process according to FIG. 4 may also decrease identified agents' concurrency settings at the end of an identified interval. For example, a process may compare the agent's AHT to a required level, and if it is at or higher than this level, may recommend updating or setting concurrency for digital skills for the agent for this interval, and if no, continue evaluating other agents. In some embodiments, the raising or changing of a concurrency setting may affect how a process, such as an ACD process, connects or distributes interactions according to the concurrency setting. Thus in one embodiment, if the agent does not have high proficiency, the process may move to operation 442.

In operation 440, it is determined if the agent is currently handling a voice call; if yes, the process may move to operation 442; if no, the process may move to operation 424. An agent handling voice calls might not be fully available to manage the digital skill requirements, even if they have the required digital skill proficiency. If the agent is involved in a voice call, the process may consider moving to the next agent because that agent might not be available to handle digital tasks, or handling other skills may negatively impact a voice skill. This may help ensure that the digital skill requirements are adequately met without overburdening an agent who is already handling voice tasks. If the agent is not involved in any voice calls, the process may proceed with including this agent in the staffing count for digital skills.

After this check, if staffing meets the required agent list, the algorithm may proceed to either finalize the staffing recommendations or evaluate if any further actions are needed (e.g., adjusting concurrency settings). Moving to the next agent might not be necessary if all requirements are met. A process may use more than one agent (e.g. alter the concurrency settings of more than once agent), for example if capacity is affected by an absence such that concurrency settings for more than one agent need to be altered. Thus the process described in FIG. 4 may be iterative.

In operation 442, it may be determined if all agents have been evaluated for this skill: if yes, recommendations may be published or automatically acted on; if no, the process may move to the next agent. Thus in operation 442, the process may move to the next agent in the list if the list is not empty: if the list is empty the process may move to operation 444; if the list is not empty the process may move to operation 412. If an agent with required proficiency for the digital skill is not identified, the process may conclude that the skill is impacted by the leave request and there is no mitigation available. In operation 444, it is determined if staffing (e.g. the actual number of agents determined as working during the interval in question) is greater than the required number of agents for the interval. If no; the process may keep searching, and move to operation 448 (determine if the process has moved to the end of the skill list); if yes, in operation 446, a recommendation may be (to be published in operation 450) that while the SLA is impacted for this skill, no other agent is available to meet the staffing.

An embodiment may check if it has reached the end of available agent list (e.g. the total agents available in the system, or for an organization), and yes, then checks if staffing>required agent list (the required number of agents), and if this is as also yes then the process may do nothing.

In operation 448, if the process has not moved to the end of the skill list, the process may move to operation 410, and if the process has moved to the end of the skill list, in operation 450, recommendations (e.g. from operations 422, 432 and 446) may be published, transmitted or automatically acted on: for example a process may automatically update or raise a concurrency setting for a digital skill. In operation 452, based on earlier recommendations, concurrency settings may be changed, and/or automatic action may be taken (such as automatically changing concurrency settings and automatically distributing or connecting interaction data to agent devices based on such settings); or the system may be updated with new rules or settings based on the recommendations.

In the example processes shown in Table 4 and FIG. 4, staffing data may be used to analyze if a skill is impacted due to time-off and to evaluate if an SLA of an impacted skill is mitigated. After performing recommended changes, if an SLA for skills is still above a threshold, then it may be considered as an impacted skill. In such a case, the manager may decide accordingly to grant the time off to the agent impacting the skill. An agent skill mapping may be used to analyze the availability of the agent who handles interactions using the impacted digital skills or interaction handling categories. If the digital skill is assigned to an agent whose concurrency may be potentially updated then an embodiment may look for the skill proficiency of the agent, the channel type and concurrency setting for the channel, and metrics such as AHT to determine if the agent is efficient and can handle additional concurrency for limited interval. Schedule data may be a factor considered while computing recommendations. If an agent has is not scheduled during the relevant time interval but has the impacted skills, it is recommended to add this agent to the schedule. Considering these decision factors, the example process of FIG. 4 may route through multiple decision flows, searching for all relevant agents. At the end as an output it may produce list of recommendations, such as for example the following (each of which may be effected automatically):

- Increase concurrency in contact handling settings. This may include a list of agents and digital channels where number of concurrent contacts can be increased.
- Reduce concurrency in contact handling settings: digital channels where number of concurrent contacts can be reduced to balance the workload.
- Impacted skills: list of the skills with impacted SLA and no adjustment is possible for concurrent contacts handled.
- No impact: If the time-off request has no impact on the SLA, it is recommended accordingly.

A process may distribute interactions according to the concurrency settings altered per the example process of FIG. 4. The example process of FIG. 4 may allow a manager to specify an "exclusion list", such that an agent on this list will not be chosen (the process may look for next best agent to increase concurrency). This may help alleviate the problem of the same agent being recommended by the algorithm repetitively. An embodiment may allow a setting to indicate that manual intervention is not selected; and therefore interactions are routed or distributed automatically (e.g. via an ACD) based on automatic concurrency setting changes. An embodiment may allow giving permission for an automatic future change in concurrency settings, e.g. by scheduling a future action.

FIG. 5 depicts example data for a simulation of a process according to one embodiment. Referring to FIG. 5, in one simulation data includes: 1) net staffing for 3 WEM skills A, B and C (which are in one definition the skills discussed in the process of FIG. 4, and which may be a one to many mapping of multiple skills) and corresponding ACD skills, for 3 different intervals e.g. time intervals starting at 10:30, 11:30, 12:30; 2) Skills-Channels association in columns G and H, showing that, e.g. skill A means that the holder of this skill has the ability to operate in an SMS channel; 3) Agent and association with WEM skills and Proficiency Score (score shown in column L); and 4) Omnichannel settings for agents for each digital skill. For example, skill A1 may be Billing in Spanish, and may correspond to WEM Skill A, which may be performing a corresponding ACD skill in SMS. Thus WEM Skill A (which may be a skill used in the process of FIG. 4) may be Billing in Spanish via SMS and also technical support (B1) via SMS. WEM skills may be considered a broader group of ACD skills, where one WEM skill may contain one or more ACD skills of similar type. When Agent-3 applies for time-off, it is determined that the SLA for WEM Skill A will be impacted at 12:30 as there is only one agent available with similar skill. This skill corresponds to SMS Channel. It can be determined that Agent-1 has similar skills and also has better proficiency. An embodiment may thus recommend that the concurrency setting for SMS for Agent-1 be increased from 2 to 3 for this interval. After the period affected by the staffing deficit ends, settings may be automatically reset to the default, typically reduced to the default. In FIG. 5, there may be a one-to-many mapping from WEM skills to ACD skills; e.g. WEM skill B maps to both of ACD skills C1 and D1. Skills such as WEM skills may be one-to-one mapped to channels, but multiple skills may be mapped to one channel. For example, in the context of a bank contact center, skill A may be opening an account using Spanish; skill B may be handling password issues; skill C may be account opening using voice channel; skill D may be account opening using a chat channel. In the example shown, the WEM skill 'A' is mapped to ACD skills A1 and B1. If A1="opening an account in Spanish" and B1="password recovery in Spanish" then A includes both A1 and B1, e.g. account opening in Spanish and password recovery in Spanish; A in this example is mapped to channel SMS. Thus skill A used in FIG. 4 includes account opening in Spanish using SMS and password recovery in Spanish using SMS.

Figure 6:
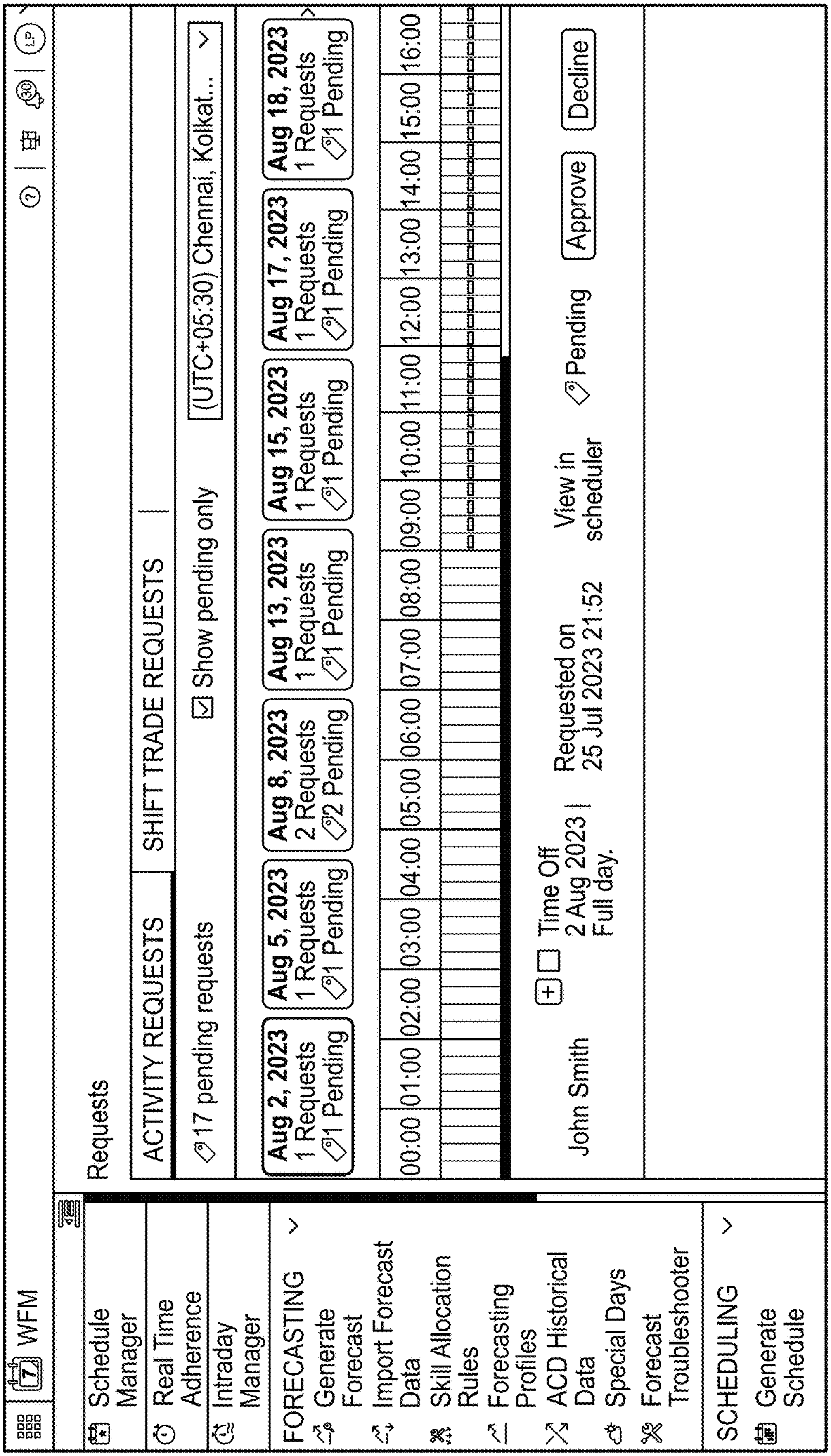
FIGS. 6, 7, 8 and 9 depict user interfaces according to embodiments of the present invention.

FIGS. 6, 7, 8 and 9 depict user interfaces according to embodiments of the present invention. Referring to FIG. 6, an Activity Request tab displays currently pending time-off requests. Each row on this example screen shows the user request along with request type (e.g. time-off), and details such as date and time, status of request. An option may allow a manager to view schedules and act on the request, e.g. approve or reject. In FIG. 6 a user interface may allow a manager to view partial or full-day time-off requests. In this example screen, agent Laukik Patil has applied for full day time-off, on August 2. This request is pending for approval.

Figure 7:
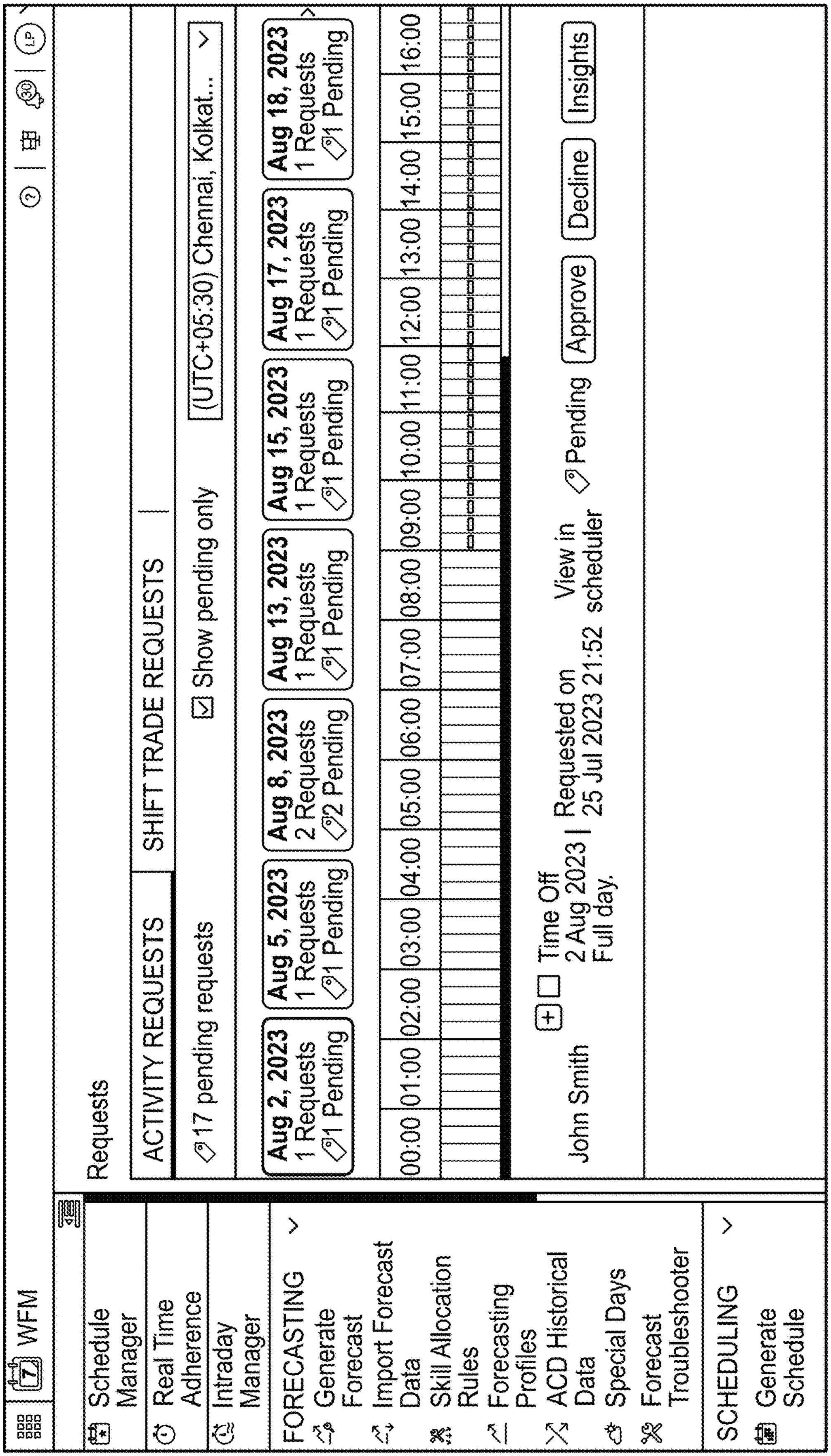
Figure 8:
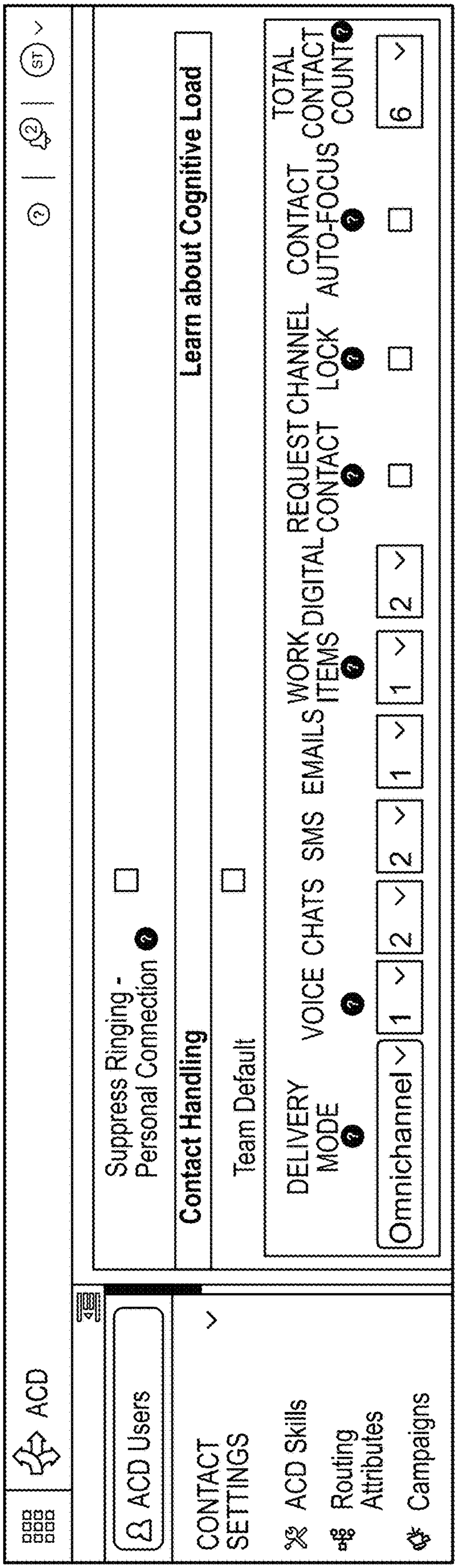
Figure 9:
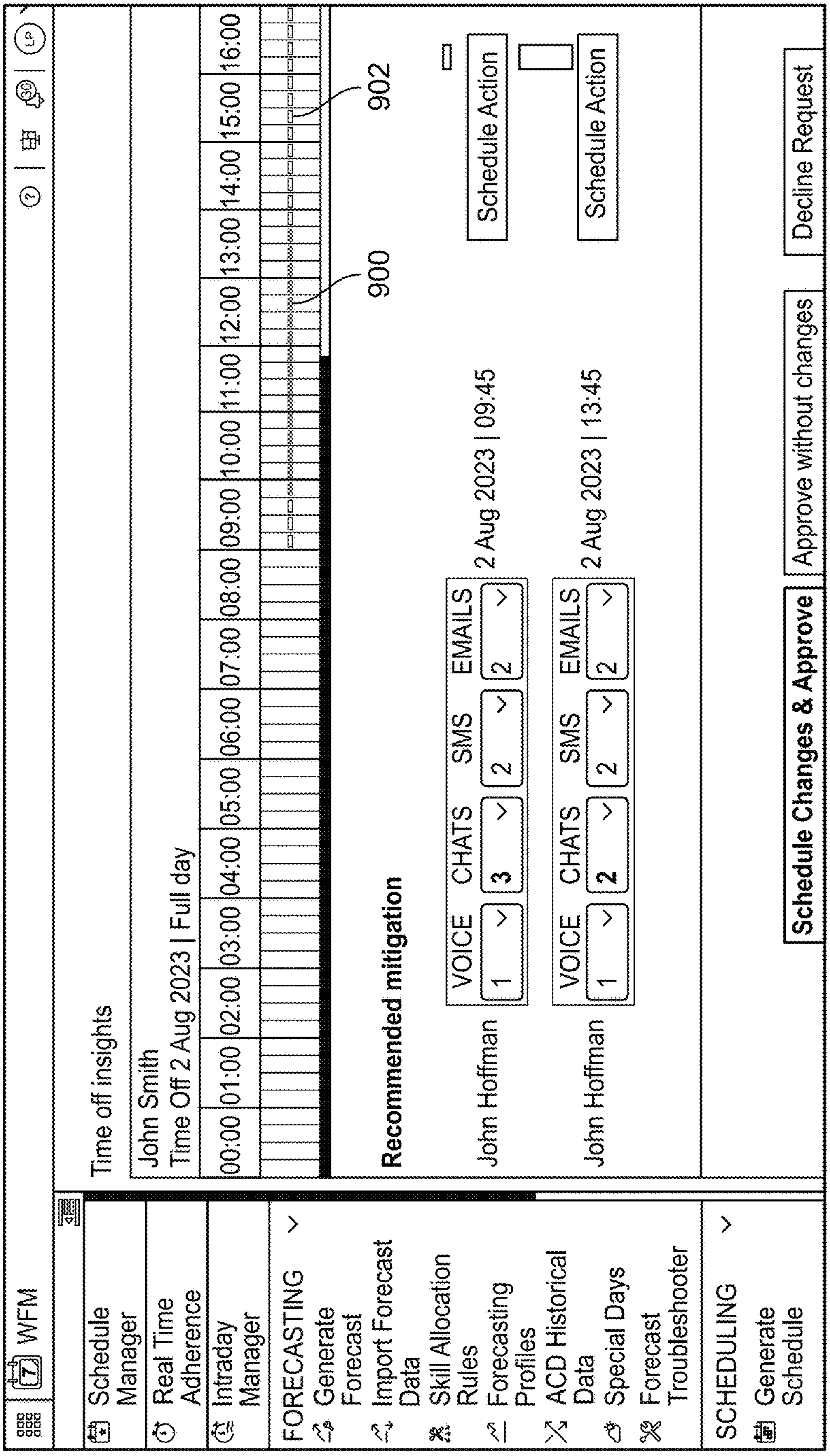

FIG. 7 displays the example scenario of FIG. 6 after an embodiment of the invention processes the request, e.g. using a time-off module. A user may click a button "Insights" to view the impact and recommendation for the time-off request before taking the action. After a click of the "insights" button, a user may navigate to the example screen shown in FIG. 8. FIG. 8 is an example display of an interface of an ACD where an administrator or supervisor can manually set the concurrent number of contacts the agent can handle for each channel type. The configuration can be set differently for each individual agent. FIG. 9 is an example display of the insights along with automation buttons. Mark 900 indicates the SLA would be impacted, using this example data, for these time intervals while mark 902 indicates that the SLA remains intact even if the time-off request is approved. The interface of FIG. 9 displays recommendations to update concurrent contacts settings for digital channels for another agent to mitigate the impact highlighted of the data shown in FIGS. 6-8. Using the "Schedule Action" button on the right in FIG. 9, those actions can be scheduled to automatically occur at the given date and time. By clicking on "Schedule Changes & Approve" or other buttons at the bottom of the UI of FIG. 9, the manager can act on the time-off request. In the example of FIG. 9, the screen shows that approving a time-off request for "Laukik Patil" will cause some skills to go out of (e.g. not in conformance with) SLA during the interval from 9:45 to 13:45. At the same time, the UI of FIG. 9 provides a recommendation to update the concurrent contacts setting to "3" for John Hoffman agent for the interval 09:45 and revert it back to "2" later at 13:45 interval to mitigate this risk. A user can also choose to schedule these re-skill actions to automatically happen at the recommended date and time.

Recommendations published or displayed may include for example:

- Interval identified which SLA is impacted for certain skills and the digital channel corresponding to this skill;
- Agents for whom the number of concurrent contacts setting for the digital channel can be temporarily increased;
- Date and time when the concurrency setting should be increased and when it should be reverted to previous setting.

Various appropriate data structures may be used. An example ACD Skills with Defined SLA Data structure is depicted in Table 5. This example dataset serves as input for understanding ACD skills and their associated SLAs configured within an ACD system. Such data may provide insights into the specific skills defined for routing incoming calls and the corresponding performance targets outlined in the SLAs, and may enable effective management and optimization of call routing strategies, ensuring adherence to service level commitments and enhancing overall customer experience.

TABLE 5

```
{ [{"acdSkillId": "callingTest1",
"SLA":"10"
},
 {"acdSkillId": "callingTest2",
"SLA":"2"
}]]
```

An example WFM Scheduling Net Staffing Data per Interval dataset is depicted in Table 6. Table 6 presents a summary of net staffing levels per an example 15-minute interval, offering insights into the workforce management (WFM) scheduling process. By detailing the staffing requirements at regular intervals, it may enable the WFM engine to accurately determine the necessary workforce allocation for each time segment. This information may optimizing resource allocation, ensuring adequate staffing levels to meet operational demands, and ultimately enhancing efficiency and productivity within the organization.

TABLE 6

```
{
  "totalNet" : [ {
    "periodStartTime" : "2024-01-29T03:00:00Z",
    "required" : null,
    "staffed" : 0.0,
    "net" : 0.0
  }, {
    "periodStartTime" : "2024-01-29T03:15:00Z",
    "required" : null,
    "staffed" : 0.0,
    "net" : 0.0
  }]
```

Example WFM Skill and User Association Data is depicted in Table 7. This example dataset captures the relationship between users and their associated WFM skills, facilitating the identification of skill sets possessed by individuals within the scheduling system. By mapping users to specific WFM skills, an embodiment can efficiently determine which users are qualified to handle schedule change requests based on their skill proficiencies. This information may streamline scheduling process and improve ACD technology by allowing interaction data to be routed to users with the appropriate expertise.

TABLE 7

{
"userId" : "11ee5c6f-1b18-a7f0-b230-0242ac110003",
"skillIds" : [ "11ee8de3-2d17-c850-9722-0242ac110003" ]
}, {
"userId" : "11e8db49-f662-4110-bc8b-0242ac110007",
"skillIds" : [ "11ee27a6-0c86-f690-b606-0242ac110005", "11ee8de3-2d17-c850-9722-0242ac110003", "11ee8de3-c5e9-5580-9722-0242ac110003" ]
}

Example WFM Skill and ACD Skill Mapping Data is depicted in Table 8. This example dataset may correlate between WFM skills and ACD skills, providing insight into the associations between users and the skills required for ACD-based tasks. By mapping WFM skills to their corresponding ACD counterparts, an embodiment may determine which users possess the necessary skills to handle specific ACD functions. This mapping may coordinate between workforce management and call distribution processes, ensuring that tasks are assigned to appropriately skilled users.

TABLE 8

{
"skills" : [ {
"id" : "11ed987d-6f10-cf60-a8fc-0242ac110005",
"name" : "voiceTest1",
"updatedOn" : null,
"insertedOn" : null,
"acdSkillInfos" : [ {
"acdSkillId" : "callingTest1"
} ],
"channelId" : "
11e76c92
-0f5e-6900-a7f1-0021ccc2f98f",
"colorCode" : "#e7268d",
"proficiencyEnabled" : true,
"assignedUserCount" : 5
}
]}

Example WFM Schedule Change Request Data is depicted in Table 9. This example dataset may include user and interval details for schedule change requests within a WFM system. Leveraging other data sets, an embodiment may identify the user associated with the request, the affected intervals, and then determine the user's ACD skill. By referencing staffing requirements data, an embodiment may assess the impact of the schedule change on ACD skill SLAs. Such an analysis may enable an embodiment to anticipate staffing adjustments, ensure adherence to ACD skill SLAs, and maintain optimal data or interaction distribution in response to schedule changes.

TABLE 9

{"requestUuid" : "11ee3235-abe0-1930-aedf-0242ac110002",
"userUuid" : "11ed5a8c-41e4-36f0-8ec6-0242ac110002",
"userName" : "Agent_Jack",
"creationTime" : "2023-08-03T19:40:59Z",
"startTime" : "2023-08-04T18:30:00Z",
"endTime" : "2023-08-05T18:29:59Z",
}]

Example Schedule Change Impact Analysis Insight data is depicted in Table 10. This example dataset may provide insights into the impact of schedule change requests on SLAs. By analyzing each schedule change request, an embodiment may generate a mitigation plan tailored to address potential impacts on SLAs related to skills. These insights may offer proactive strategies to mitigate adverse effects on service levels.

Recommendation per schedule change request

TABLE 10

{"requestUuid" : "11ee3235-abe0-1930-aedf-0242ac110002",
"userUuid" : "11ed5a8c-41e4-36f0-8ec6-0242ac110002",
"userName" : "Agent_Jack",
"creationTime" : "2023-08-03T19:40:59Z",
"startTime" : "2023-08-04T18:30:00Z",
"endTime" : "2023-08-05T18:29:59Z",
"Contact Handling"{
"DeliverMode": OmniChannel
"Voice": "1",
"Chat": "1",
"SMS": "1",
"EMAILS": "1",
"WORL_ITEMS" : "1",
"TOTAL_CONTACT_COUNT": 2
}
}]
}

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention. Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What is claimed is:

1. A method of managing interaction distribution in a contact center, the method comprising:

for a digital skill relating to interaction handling and impacted by a lack of resources during an interval:

computing, by a processor, a staffing impact on the digital skill for the interval by comparing a required staffing number against a number of currently scheduled agents for the interval;

determining, from among a plurality of agents, an agent having the digital skill assigned thereto and scheduled during the interval, wherein the determining comprises evaluating the agent's proficiency score for the digital skill and average handling time (AHT) for the digital skill;

raising the identified agent's concurrency setting for the digital skill for the interval based on the agent's proficiency score and the AHT, wherein the concurrency setting determines how many interactions relating to the digital skill the agent can handle concurrently;

distributing interactions according to the concurrency setting; and automatically reverting the concurrency setting to a prior value at the end of the interval.

2. The method of claim 1, wherein the digital skill is selected from the group consisting of: handling an interaction via text messaging; handling an interaction via web-browser chat; and handling an interaction via e-mail.

3. The method of claim 1, further comprising sorting a set of skills impacted by the lack of resources by impact on service.

4. The method of claim 1, further comprising iterating through a set of agents.

5. A system for managing interaction distribution in a contact center, the system comprising:

a memory; and a processor to:

for a digital skill relating to interaction handling and impacted by a lack of resources during an interval:

compute a staffing impact on the digital skill for the interval by comparing a required staffing number against a number of currently scheduled agents for the interval;

determine, from among a plurality of agents, an agent having the digital skill assigned thereto and scheduled during the interval, wherein the determination comprises evaluating the agent's proficiency score for the digital skill and average handling time (AHT) for the digital skill;

raise the identified agent's concurrency setting for the digital skill for the interval based on the agent's proficiency score and the AHT, wherein the concurrency setting determines how many interactions relating to the digital skill the agent can handle concurrently;

distribute interactions according to the concurrency setting; and automatically revert the concurrency setting to a prior value at the end of the interval.

6. The system of claim 5, wherein the digital skill is selected from the group consisting of: handling an interaction via text messaging; handling an interaction via web-browser chat; and handling an interaction via e-mail.

7. The system of claim 5, wherein the processor is to further sort a set of skills impacted by the lack of resources by impact on service.

8. The system of claim 5, wherein the processor is to further iterate through a set of agents.

9. A method of distribution of data in a contact center, the method comprising:

for a category of interaction handling and impacted by a lack of resources during a time interval:

computing, by a processor, a staffing impact on the category for the time interval by comparing a required staffing number against a number of currently scheduled agents for the time interval;

determining, from among a plurality of agents, an agent associated with the category and scheduled during the time interval, wherein the determining comprises retrieving the agent's proficiency score for the category and average handling time (AHT) for the category;

altering the identified agent's concurrency setting for the category for the time interval based on the agent's proficiency score and the AHT, wherein the concurrency setting determines how many interactions relating to the category the agent can handle concurrently;

connecting interactions according to the concurrency setting; and automatically reverting the concurrency setting to a prior value at the end of the time interval.

10. The method of claim 9, wherein the category is selected from the group consisting of: handling an interaction via text messaging; handling an interaction via web-browser chat; and handling an interaction via e-mail.

11. The method of claim 9, further comprising sorting a set of categories impacted by the lack of resources by impact on service.

* * * * *